Figure 1:
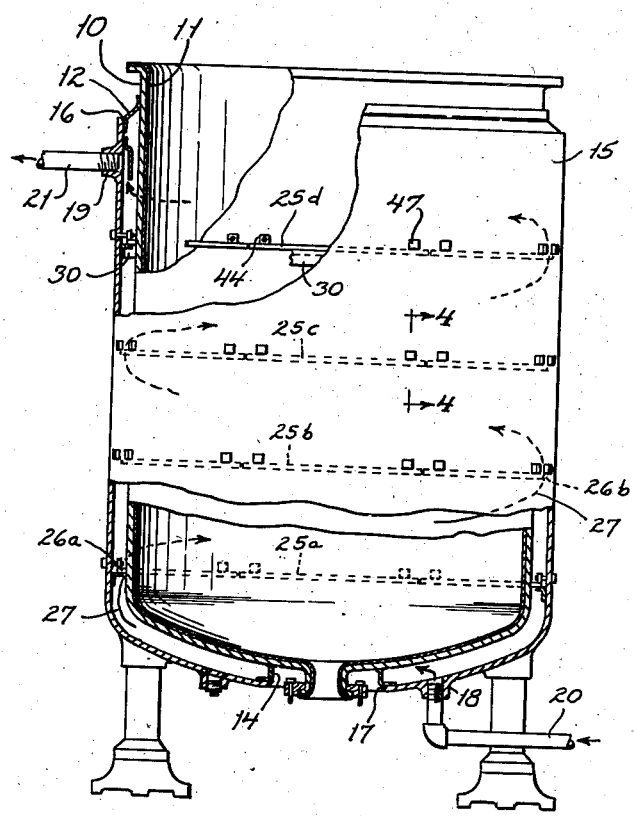

June 4, 1946.  C. S. BROWN  2,401,606
METHOD OF MANUFACTURING TANKS
Original Filed June 5, 1942

INVENTOR.
CARL S. BROWN
BY
Bates, Teare, & McBean
ATTORNEYS

Patented June 4, 1946

2,401,606

UNITED STATES PATENT OFFICE 2,401,606

METHOD OF MANUFACTURING TANKS

Carl S. Brown, Lakewood, Ohio, assignor to Glascote Products, Inc., Cleveland, Ohio, a corporation of Ohio Original application June 5, 1942, Serial No. 445,845. Divided and this application January 14, 1943, Serial No. 472,329

2 Claims. (Cl. 29—162)

This invention relates to an improved method of manufacturing a jacketed tank or kettle. More particularly, this invention is concerned with an improved method of manufacturing a jacketed container or tank of a type using a heat transfer medium, such as a hot or cold fluid or vapor, which is circulated in the region between the tank and the jacket to effect a heating or chilling of the contents of the tank. These, therefore, are the general objects of the present invention. The present application is a division of my co-pending application, Serial No. 445,845, filed June 5, 1942.

Jacketed tanks or kettles are in extensive use at the present time to heat or cool plastic mixtures or fluids, for instance, in dairy processing and chemical plants. In many instances the materials to be treated are such that it is preferable to use metal tanks, the size of which may vary from two or three gallons to two or three thousand gallons. Many materials to be treated are of such a nature that it is desirable to coat the interior of the tank, either for sanitary purposes or to prevent corrosion or other chemical reaction of the tank itself. It has been found that a very efficient form of coating comprises a comparatively thin layer of fusible material, such as glass, which may be fused to the internal surfaces of the tank. In such tanks the jackets are applied to the tank after the fusion of the coating has been completed.

To facilitate the circulation of the fluid or vapor heat exchange medium in the jacket, it has been found advantageous to utilize a series of partitions or baffles which extend transversely from the inner wall of the jacket wall to the exterior wall of the tank. These baffles are so arranged that when the heat exchange medium is forced through the jacket it will be circulated through a passageway or passageways formed by the baffles and thus insuring circulation throughout the entire area of the jacket and contact with the entire surface of the tank.

When the tanks are coated internally with a fusible material, it has been found difficult to position the baffles between the jacket and the tank so as to insure the desired circulation. This is partially due to warping of the tank when it is heated to fuse the coating thereto. Likewise, after the coating has been fused to the tank it is no longer practical to attach the baffles to the wall thereof, because of the danger of cracking or otherwise spoiling the coating.

Because of these difficulties, baffles have been generally omitted from the jackets of coated tanks. In the few instances where they have been used, they have been secured to the internal wall of the jacket and the tank then lowered into position in the jacket. To permit such positioning of the tank within the jacket, these baffles are so constructed as to leave a considerable space between the outer wall of the tank and the inner edge of the baffle such as would accommodate a maximum amount of warpage of the tank. While this clearance between the baffle and the walls of the tank permitted the lowering of the tank into the jacket, it seriously impaired the effect of the baffle. Therefore, a more specific object of the present invention, is to provide a method of manufacturing a jacketed tank which will permit the use of baffles in coated tanks and yet overcome the disadvantages above set forth.

Other advantages and objects of the present invention will become more apparent from the following description, reference being made to the accompanying drawing in which the preferred embodiment of the invention is illustrated. The novel features of the invention will be summarized in the claims.

Figure 2:
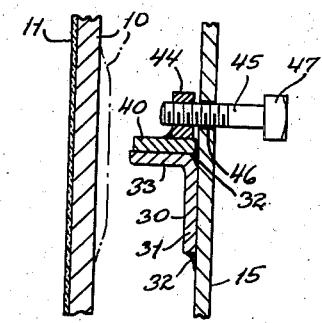
Figure 3:
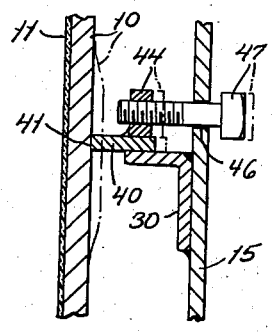
Figure 5:
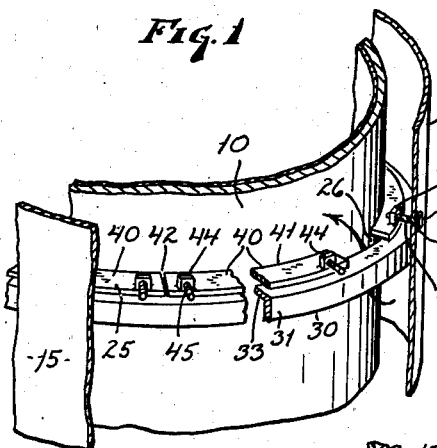
Figure 4:
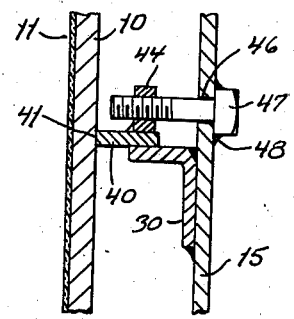

In the drawing, Fig. 1 is a side elevation of a jacketed tank or kettle constructed in accord with the present invention, certain parts thereof being broken away to more clearly illustrate the internal construction; Figs. 2, 3, and 4 are fragmentary vertical sections taken generally along the line 4—4 of Fig. 1 and illustrating respective steps in the method of manufacturing the tank; Fig. 5 is a fragmentary perspective view illustrating the baffles in place, certain portions being broken away to more clearly illustrate the construction, and Fig. 6 is a sectional view similar to Fig. 3, but illustrating a slightly modified method of securing the baffle in place.

Referring now to the drawing in detail, and particularly to Fig. 1, it will be seen that the tank illustrated therein comprises a cylindrical open topped metal tank 10 substantially closed at its lower end and provided with an internal coating 11 of a material which has been fused to the internal surface of the tank. Prior to the fusing of the coating, flanges 12 and 14 are applied to the exterior of the tank adjacent its upper and lower ends respectively. These flanges facilitate the securing of a hollow metallic jacket 15 to the kettle as, for instance, by welds 16 and 17 without affecting the fused coating 11. At one end of the tank, as for instance the bottom, the jacket is provided with an inlet 18 and at the other end, as for instance adjacent the top, the jacket is provided with an outlet 19. The inlet and outlet are so arranged as to accommodate conduits, generally indicated at 20 and 21, whereby a fluid heat transfer medium may be forced into the space between the jacket and the tank.

To insure contact between the circulating heat transfer medium and all areas of the tank, baffle members are provided. These baffles, as shown, comprise plate-like members which extend transversely between the internal surface of the jacket and the external surface of the tank. Generally there are a series of these baffles, for instance indicated at 25a, 25b, 25c, and 25d, in Fig. 1. Each baffle member extends around the tank and is spaced above or below the adjacent baffle member to provide circulation passageways. Alternate baffles are provided with openings or gaps at alternate sides of the tank. For instance, the baffle 25a is provided with a gap or opening 26a at the right hand side of the tank (Fig. 1), whereas, the baffle 25b is provided with a gap 26b at the opposite side of the tank, thus causing the heat transfer medium to circulate from one passageway to another, as indicated by the arrows 27 in Fig. 1. These baffles may extend diametrically around the tank as indicated in Fig. 1, or they may comprise a single baffle member spiralled around the tank to form a continuous spiralled passageway from the inlet to the outlet. In the latter instance, the openings or gaps 26a in the baffles are then omitted.

Figure 6:
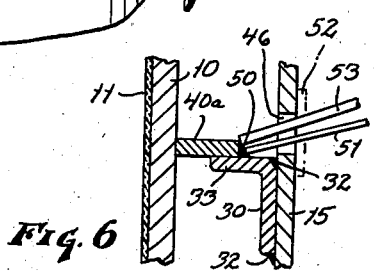

The baffles 25 are carried as shown in Figs. 2 and 6, by a support 30. This support comprises an angle, one leg 31 of which is secured to the interior of the jacket, as for instance, by welds 32 and the other leg 33 of which extends inwardly from the jacket toward the tank wall 10, a distance somewhat over half of the distance between the inner surface of the jacket and the outer surface of the tank wall. The leg 33 of the support carries a plurality of segmental baffle members or plates 40 which are arranged to be slid inward along the support into contact with the tank wall as shown at 41 in Figs. 2 to 5. These arcuate baffle plates 40 are spaced a slight distance from each other as indicated at 42 (Fig. 5) to permit them to be moved freely inwardly without binding one against the other. Secured to each baffle plate adjacent its ends are upwardly extending ears or lugs 44 which are threaded to receive the bolts 45. The jacket 15 is provided with a series of openings 46 aligned with the openings in the lugs 44 and through which the bolts 45 may be passed permitting them to be inserted in the lugs from the exterior of the jacket.

In assembling the structure, the baffles 40 and the positioning bolts 45 are mounted in the jacket in the position shown in Fig. 2. The kettle or tank 10 is then lowered into the jacket and the bolts 45 pushed forward until the inner end of the respective baffle plates abut the outer wall of the tank (Fig. 3), whereupon the bolts are turned until the heads 47 thereof substantially abut the outer wall of the jacket. The heads 47 of these bolts are then welded in position as indicated at 48 on Fig. 4, thus securing the bolts in position and sealing the openings 46 in the jacket wall.

Inasmuch as the baffle plates 40 are segmental, it is obvious that they may be moved into intimate contact with the external surface of the tank and will substantially compensate for any warping of the tank which causes variations in the distances between the tank and the jacket at various points as indicated by the broken lines in Figs. 2 and 3.

In Fig. 6, I have shown a modified method of construction wherein the baffle plates 40a are laid on the supports 30 and spot-welded in place by means of a welding rod 51 which has been passed through the opening 46 of the jacket wall. After the welding takes place a suitable plug or cover member may be welded to the outer surface of the jacket as indicated at 52, to make the jacket liquid tight. A tool, such as a rod 53, may be inserted in one of the openings and used to hold the baffle in place while it is being spot-welded at the same or another point. While the form shown in Fig. 6 may perhaps seem more economical in construction, it has been found that the preferred form, namely, that using the positioning bolts has the advantage of facilitating repairs to the tank if such be needed. The heads of the bolts may be severed from the jacket wall by a cutting torch, whereupon the tank may be removed from the jacket. The bolts may then be removed and replaced with others following the repair of the unit.

The jacket may be welded to the tank flanges 12 and 14 in the usual manner, either before or after the baffles have been positioned, thus providing a very efficient tank which, due to the number of individual arcuate baffle units, enables them to maintain comparatively close contact with the wall of the tank despite discrepancies in the shape of the tank, thus insuring a high degree of circulation of the heat transferring medium and thereby greatly increasing the efficiency of the tank.

From the foregoing description it will be seen that I have provided an efficient and improved method for manufacturing jacketed tanks. While the method is particularly advantageous in the manufacture of glass lined, enameled and other coated tanks, it is nevertheless advantageous in manufacturing uncoated tanks, especially tanks of large diameter, as in all such tanks it is difficult to provide cylindrical formations with as high a degree of accuracy as permits the tank to be inserted in a baffled jacket and yet maintain contact between the baffles and the tank.

I claim:

1. The method of making a jacketed tank having spaced inner and outer shells with circumferentially extending fluid baffles extending radially and bridging the gap between the two shells comprising securing a circumferentially extending radially projecting baffle to the inner wall of an outer tank shell, mounting a plurality of segmental extensions on said baffle, positioning a preformed inner tank shell within the outer shell, and subsequently moving said extensions individually into contact with the outer wall of the inner shell, to thereby completely bridge the gap between the two shells.

2. The method of making a jacketed tank having spaced inner and outer shells with a substantially circumferentially extending radially projecting fluid baffle bridging the gap between the two shells comprising forming an inner shell and an outer shell, securing to the inner wall of the outer shell a circumferentially extending inwardly projecting baffle of less width than the minimum distance between the two shells, mounting a plurality of segmental extensions on said baffle, thereafter positioning the inner shell within the outer shell, and subsequently moving the extensions into contact with the inner shell and securing them in place.

CARL S. BROWN.